United States Patent [19]

Kuckes

[11] 4,372,398

[45] Feb. 8, 1983

[54] METHOD OF DETERMINING THE LOCATION OF A DEEP-WELL CASING BY MAGNETIC FIELD SENSING

[75] Inventor: Arthur F. Kuckes, Ithaca, N.Y.

[73] Assignee: Cornell Research Foundation, Inc., Ithaca, N.Y.

[21] Appl. No.: 203,912

[22] Filed: Nov. 4, 1980

[51] Int. Cl.³ .................... E21B 7/04; E21B 47/02; G01V 3/08; G01V 3/26
[52] U.S. Cl. ................... 175/45; 166/65 M; 175/61; 324/346; 324/355; 324/357
[58] Field of Search ............. 175/45, 40, 61, 62; 166/255, 254, 65 M; 324/326, 345, 346, 355, 357

[56] References Cited

U.S. PATENT DOCUMENTS

| | | | |
|---|---|---|---|
| 1,791,933 | 2/1931 | Mueser | 324/359 |
| 1,803,405 | 5/1931 | Ricker | 324/359 |
| 1,845,379 | 2/1932 | West | 324/368 |
| 1,902,265 | 3/1933 | Rieber | 324/345 |
| 1,906,271 | 5/1933 | Jakosky | 324/1 |
| 1,934,079 | 11/1933 | Lundberg et al. | 175/182 |
| 1,997,163 | 4/1935 | Ricker | 324/358 |
| 2,062,630 | 12/1936 | Zuschlag | 175/182 |
| 2,108,463 | 2/1938 | Zuschlag | 175/182 |
| 2,183,565 | 12/1939 | Hawley | 175/182 |
| 2,199,367 | 4/1940 | Athy et al. | 175/182 |
| 2,261,563 | 11/1941 | Rieber | 175/182 |
| 2,262,419 | 11/1941 | Athy et al. | 175/182 |
| 2,291,692 | 8/1942 | Cloud | 324/8 |
| 2,359,894 | 10/1944 | Brown et al. | 175/182 |
| 2,364,159 | 12/1944 | Muffly | 175/182 |
| 2,663,004 | 12/1953 | Seigel | 324/10 |
| 2,723,374 | 11/1955 | Williams | 324/1 |
| 2,730,673 | 1/1956 | Jakosky | 324/7 |
| 2,787,758 | 4/1957 | Walstrom | 324/1 |
| 3,151,291 | 9/1964 | Eisler | 324/1 |
| 3,256,480 | 3/1965 | Runge | 324/10 |
| 3,282,355 | 11/1966 | Henderson | 175/40 X |
| 3,285,350 | 11/1966 | Henderson | 175/40 X |
| 3,329,891 | 7/1967 | Todd | 324/10 |
| 3,398,356 | 8/1968 | Still | 324/6 |
| 3,406,766 | 10/1968 | Henderson | 175/61 |
| 3,479,581 | 11/1969 | Runge | 324/6 |
| 3,488,574 | 1/1970 | Tanguy | 324/1 |
| 3,525,037 | 8/1970 | Madden et al. | 324/7 |
| 3,697,864 | 10/1972 | Runge | 324/10 |
| 3,712,391 | 1/1973 | Coyne | 175/45 X |
| 3,722,605 | 3/1973 | Isham | 175/40 |
| 3,731,752 | 5/1973 | Schad | 175/45 |
| 3,763,419 | 10/1973 | Barringer | 324/6 |
| 3,772,605 | 3/1973 | Isham | 175/40 |
| 3,778,701 | 12/1973 | Runge | 324/10 |
| 3,798,533 | 3/1974 | Schuster | 324/10 |
| 3,828,867 | 8/1974 | Elwood | 175/45 |
| 3,849,722 | 11/1974 | Nilsson | 324/9 |
| 3,975,676 | 8/1976 | Bliamptis | 324/9 |
| 3,984,758 | 10/1976 | Millon | 324/6 |
| 4,016,942 | 4/1977 | Wallis et al. | 175/45 |
| 4,021,774 | 5/1977 | Asmundsson et al. | 175/45 X |
| 4,072,200 | 2/1978 | Morris et al. | 175/45 |

FOREIGN PATENT DOCUMENTS

983704  2/1976  Canada ........................ 166/255

OTHER PUBLICATIONS

"Magrange" Brochure, published by Tensor, P. O. Box 14843, Austin, TX.

"A New Method of Determining Range and Direction from a Relief Well to a Blowout Well", by F. J. Morris et al., presented at 52nd Annual Fall Technical Conference & Exhibition of Society of Petroleum Engineers of AIME.

"A New Magnetic Ranging System Pinpoints Blowout Well Location", by F. J. Morris et al., Oil and Gas Journal.

*Primary Examiner*—Stephen J. Novosad
*Attorney, Agent, or Firm*—Jones, Tullar & Cooper

[57] ABSTRACT

A method of locating a deep well casing at substantial distances below the earth's surface, and for directing the drilling of a second relief well to intersect the first well at substantial distances below the earth's surface is disclosed. A low frequency alternating electric current flow is produced in the casing of the well to be detected by means of current injected into the earth surrounding the first well. The current flow in the casing produces a magnetic field which is detectable by a sensitive magnetic field sensor suspended in the relief hole and spaced a substantial distance from the current source. The magnetic field sensor detects the magnitude and apparent direction of the alternating field, and this measurement is combined with a concurrent measurement of the earth's magnetic field to determine the direction and distance of the casing from the relief well. This information is then used to direct the continued drilling of the relief well, with periodic measurements being made to provide directional control of the drilling so that the first well is intersected at the desired depth below the earth's surface.

8 Claims, 8 Drawing Figures

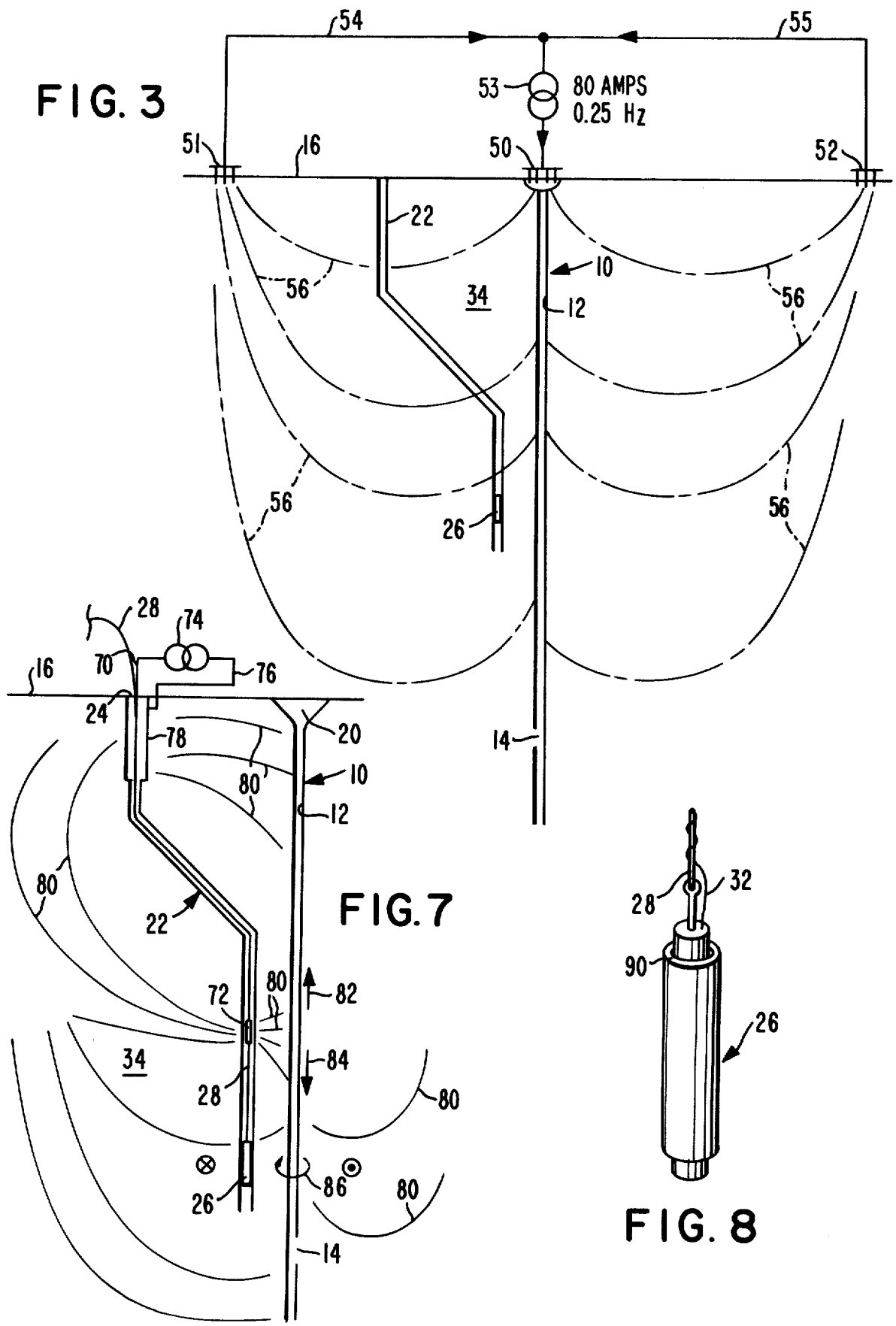
FIG. 3
FIG. 7
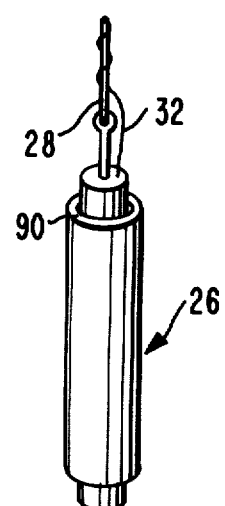
FIG. 8

METHOD OF DETERMINING THE LOCATION OF A DEEP-WELL CASING BY MAGNETIC FIELD SENSING

BACKGROUND OF THE INVENTION

The present invention relates, in general, to a method of locating the borehole of a deep well at a substantial distance below the earth's surface, and more particularly to a method for locating such a well bore by means of a magnetic field produced by current flowing in the casing of such a well bore.

It is well known in the art that in drilling deep wells for oil and gas exploration, precise control of the path followed by the well is extremely difficult, so that it is virtually impossible to know the exact location of the well at a given depth. For example, a drilling tolerance of plus or minus one quarter of a degree will allow the bottom of a 10,000 foot well to be positioned anywhere within a circle 87 feet in diameter, and numerous factors can increase this deviation. This is not of particular concern in normal drilling operations, but if an accident should occur, such as a rupture in the casing of the well which causes the well to blow out, it may become necessary to plug the well at or below the point of the rupture to bring it under control. In order to do this, a relief well must be drilled to intersect the original well at the desired level, and since such blow outs produce extremely hazardous conditions at the surface in the vicinity of the original well, the relief well must be started a considerable distance away and drilled at an incline in order to protect the personnel and the equipment used.

Because the same problems of control of the direction of drilling are encountered in the relief well as were encountered in the original well, the location of the relief well bore cannot be determined with precision; accordingly, it is extremely difficult to determine the distance and direction from the relief well to the blown out well. A further difficulty is that in some cases the force of the explosion resulting from the rupturing of a well casing can do so much damage at the surface that it may be difficult to say exactly where the well head is, much less where the well is located at a depth of 10,000 feet or more. Because of the danger at the well head, the relief well is started one-half mile or more away from the area of the original well head, angles toward the original well until it approaches relatively closely, and then follows the original well to the location where the wells are to intersect. Thus, the relief well usually is very complex, compounding the problem of knowing exactly where it is located with respect to the original well.

Numerous attempts have been made to provide accurate measurements of well location, and many surveying techniques are available which can give general information as to the location of a relief well with respect to a target well. However, such survey techniques are not capable of providing data concerning the relationship of the relief well to the original (target) well until the relief well has approached very near the original well; i.e., within a few tens of feet. At that point, equipment such as the "Magrange" (Magnetic gradient ranging) system developed by Tensor, Inc. of Austin, Texas, and Houston Oil and Minerals Research and Development, Inc., can be used with considerable accuracy; but it has been found that outside a radius of a few tens of feet, the Magrange system is usually inadequate.

In an attempt to extend the distance at which accurate information can be obtained, a variety of electrical well logging techniques have been used which treat the target well as an anomaly in the geologic structure of the earth surrounding the relief well. The art of electrical well logging is highly developed, and although systems such as the "ULSEL" (ultra-long-spaced electrode logging) system have been successfully used in locating geologic anomalies of certain types, they have been less than satisfactory in guiding relief well bores to locate and intersect existing bore holes. The ULSEL system is described extensively in the patent literature, and particularly in U.S. Pat. Nos. 3,256,480; 3,479,581; 3,697,864; and 3,778,701, all issued to Richard J. Runge. As described in these patents, this system is directed to the measurement of the apparent resistivity of the earth across a pair of electrodes, and since no directionality is given by this method, it is ineffective for directing a relief well toward an existing well.

In addition to the resistive type logging of geological strata described in the foregoing patents, there have been attempts to obtain similar data through the use of electromagnetic prospecting. Such a system is illustrated, for example, in U.S. Pat. No. 2,723,374 to Williams, which is directed to lateral exploration from a borehole to determine the magnitude and direction of resistive anomalies in the earth. Such resistive anomalies result in variations in the pattern of an electrical current injected into the earth from electrodes mounted in the same borehole as a pair of induction sensing coils mounted at right angles to each other. These sensing coils detect massive resistive anomalies such as ore bodies, salt domes, reefs, or dipping strata which have conductivities different from the conductivities of adjacent beds, and which, therefore disturb the electrical current flow. The sensing coils are used in conjunction with other conventional well logging systems to determine the probable location of mineral deposits. However, such systems do not suggest the possibility of locating relatively small targets such as well bores.

Other systems have been developed for directing a second well with respect to a first well to permit intersection of the two. One such system is described in U.S. Pat. No. 3,282,355 to Henderson, wherein a relief well is controlled to intersect a blown-out well by the use of sonic detectors responsive to the sound produced by fluids flowing out of the blown well formation. However, such a system will not operate when there is no sound emanating from the target well, and in addition, does not provide the required degree of directional and distance accuracy. Another proposal in the prior art is the use of a signal transmitter in one well and a signal receiver in the other well. For example, in patents such as U.S. Pat. Nos. 3,285,350 to Henderson, 3,722,605 to Isham, and 4,016,942 to Wallis et al., sound waves are used as the signals, while in U.S. Pat. No. 3,731,752 to Schad, the signal is a magnetic field produced by an electromagnet. In all of these systems, however, the target well must be accessible so that the signal source can be placed in one well and the receiver in the other, and they are not effective where the target well is not open, or where there is a chance of an explosion or fire that would endanger personnel.

Thus, an accurate and reliable method for determining the direction and distance of a target well from a relief well is essential, since a runaway or blown out well is not only extremely dangerous, but can cause a great deal of environmental damage. Such a method must be relatively simple, so it can be easily used under adverse field conditions, and must provide rapid and accurate results, since it is extremely important that wells that have been ruptured be quickly located and plugged, not only to protect personnel, but because the drilling of a relief well is extremely expensive and any delay in obtaining the needed information can be extremely costly.

SUMMARY OF THE INVENTION

It is an object of the present invention to provide a method for accurately, rapidly, and reliably locating a target well so that a relief well can be guided to intersect with it at a desired depth.

It is a further object of the invention to provide a method of accurately locating a target well by means of measurements made from a relief well, which measurements are made periodically as the relief well is drilled so that the measurements can be used in guiding the relief well.

Briefly, the method of the present invention includes the steps of producing a low frequency alternating electric current flow in the casing of the target well, and, during periodic interruptions in drilling the relief well, taking measurements at selected depth intervals of the magnitude and direction of the magnetic field produced by the current flow in the target well casing. At the same time, measurements are made of the magnitude and direction of the earth's magnetic field so that the orientation of the measurement device can be determined. From these measurements, the compass direction and the distance to the target well can be determined. Based upon the information derived from periodic measurements of these magnetic field parameters, the relationship between the relief and target wells can be established with a higher degree of accuracy than was heretofore possible.

More particularly, and in accordance with a preferred embodiment of the present invention, an electric current flow is produced in the casing of a target well, or borehole, by injecting a current into the earth surrounding the target well through the use of an electrode located in the relief borehole. This electrode is carried by the logging cable and contacts the uncased sides of the relief borehole so that a current flow is established in the vicinity of the relief hole. This current flow extends between the downhole electrode and a second electrode which, in the preferred form of the invention, is located at the earth's surface in the vicinity of the head of the relief well. The injected ground current finds a path of least resistance through the casing of the target borehole, and the resulting concentration of current produces a magnetic field surrounding the casing which may be detected by a suitable field sensor such as that described and claimed in copending application Ser. No. 130,764 of Arthur F. Kuckes, filed Mar. 17, 1980, now U.S. Pat. No. 4,323,848, and entitled "Method and Apparatus for Extended Laterial Range Electrical Conductivity Logging", the disclosure of which is incorporated herein by reference. The sensor disclosed in that copending application is extremely sensitive to very small magnetic fields, and permits accurate detection of currents flowing in borehole casings located a considerable distance away from the relief hole. In the preferred form of the invention, the current generated in the target borehole casing is an alternating current of relatively low frequency which produces a characteristic magnetic field that can be detected and which produces a corresponding output signal from the magnetic field sensor.

Because the current generating electrode is located in the same borehole as the magnetic field sensor, current flow around and in the borehole can produce noise signals which tend to obscure the measurement of the target borehole current flow. Current flow in the earth surrounding the relief borehole produces negligible noise signals, however, because the field tends to be symmetrical around the borehole and thus produces cancelling magnetic fields. However, current flow through drilling mud and like materials within the borehole itself can present problems, since the sensor may not be located in the center of the borehole, but may be resting against the side so that the quantity of drilling mud is greater on one side of the sensor than on the other side. This produces a current imbalance around the sensor which results in noise signals in its output. Such noise signals can be substantially eliminated in accordance with the present invention, however, by providing a copper sleeve around the sensor to equalize the current flow.

The problem of noise signals is further avoided by spacing the current injecting electrode a substantial distance from the magnetic sensor; preferably the electrode will be spaced at least as far away from the sensor as the sensor is spaced from the approximate location of the target well. Since the current is inversely proportional to the square of the distance between the sensor and the electrode, while the magnetic field due to the current flow in the target casing is inversely proportional to only the distance, the effect of extraneous current in the production of noise signals is substantially reduced.

The signals obtained from the magnetic field sensor provide a measure of the direction and distance of the target well casing. In the course of drilling the relief well, such measurements are taken periodically at selected depths, and the resulting measurements, when taken with simultaneous measurements of the earth's magnetic field, permit a continuous calculation of the presumed location of the target well with respect to the location of the relief well, and this information can be used to guide further drilling of the relief well. Thus, as the relief well approaches the desired depth, its approach to the location of the target well can be guided so that the target well is intersected at the desired depth below the earth's surface in a rapid and effective manner without ambiguity and with resulting savings in the cost of drilling a relief well.

BRIEF DESCRIPTION OF THE DRAWINGS

The foregoing and additional objects, features and advantages of the invention will become apparent to those of skill in the art from a consideration of the following detailed description of a preferred embodiment, taken in conjunction with the accompanying drawings, in which:

FIG. 3 is a diagrammatic illustration of a second embodiment;

FIG. 7 is a diagrammatic illustration of a third embodiment; and

FIG. 8 is a detailed illustration of the improved sensor used in each of the embodiments.

DESCRIPTION OF PREFERRED EMBODIMENTS

Figure 1:
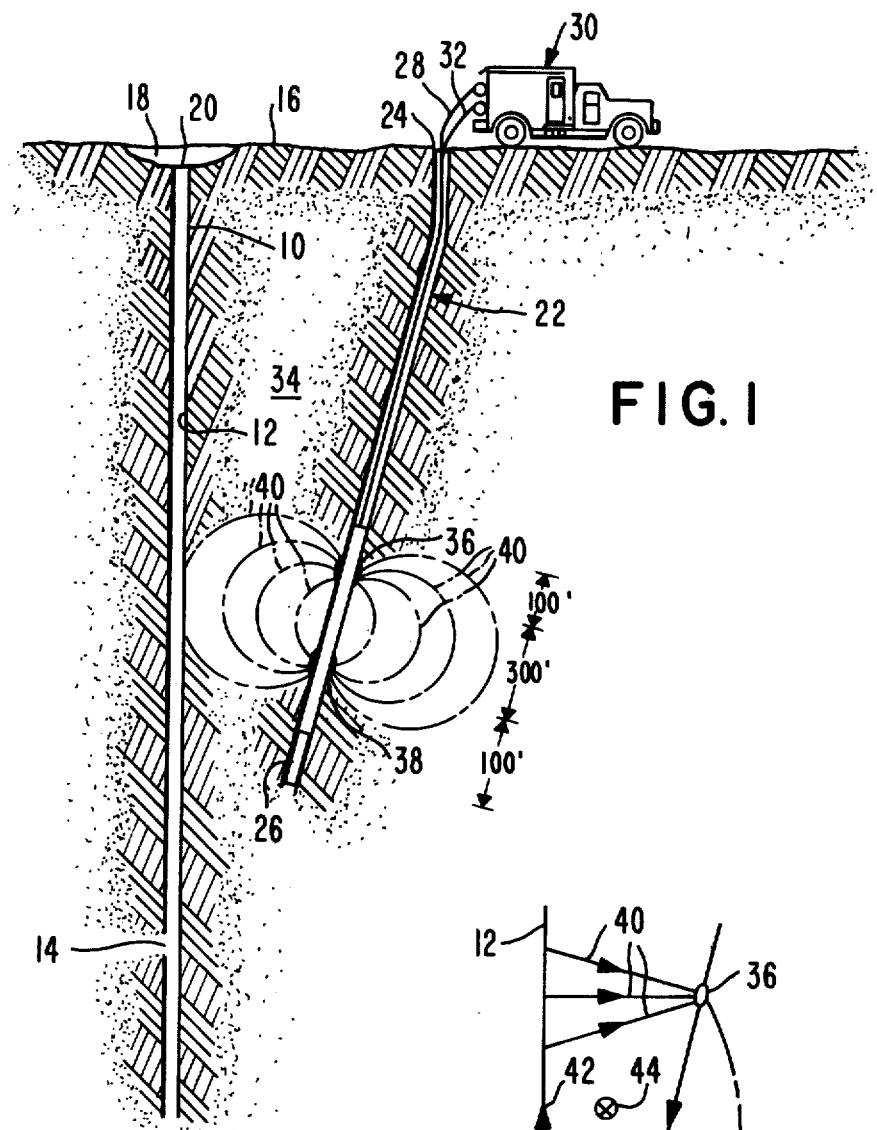
FIG. 1 is a diagrammatic illustration of a first embodiment of apparatus suitable for carrying out the method of the present invention.

The borehole locating method of the present invention will now be described in terms of the apparatus illustrated in FIG. 1 which represents one technique for producing the requisite current flow in the casing of the borehole which is to be located. In FIG. 1, the target well, or borehole, is illustrated at 10 and represents, for example, a gas well having a steel casing 12 which has ruptured at an area 14 which may be at any depth. In a recent test of the method described herein, a rupture occurred in a well at a depth of about 2,000 feet below the surface 16 of the earth, while the well was being drilled, and after the drilling operation had passed the 19,000 foot mark. When the casing ruptured, the resulting explosion blew away a 177 foot high drilling rig and left a crater 18 one hundred feet deep. Although this well was closed at the wellhead 20, for safety it became necessary to inject a cement plug deeper in the well, below the rupture and at sufficient depth for drilling mud to hold off the pressure, to insure that no further explosions could occur. In order to do this, however, it was necessary to drill a relief well, generally indicated at 22, which would intersect the well 10 so that the target well could be plugged by material fed down the relief well.

Although FIG. 1 illustrates the wells 10 and 22 as being relatively straight, in reality such wells are more complex, since the direction a drill moves through the earth cannot be controlled precisely. As indicated above, even a very small deviation in the direction of the drill can result in a significant chage in the location of of the borehole, so that at the 10,000 foot mark the target well 10 can be anywhere within a circle having a diameter of 100 feet or more. The relief well 22 is subject to the same control problems, but in addition, it must be started a safe distance from well head 20 in order to protect the personnel and the equipment used to drill the relief well. Thus, the relief well head 24 may be as much as one-half mile away from well head 20, so that borehole 22 must be drilled at complex angles which will cause the relief well to travel straight down for a distance, then curve toward an intersection with the target well at its assumed location at a depth of about 9,000 feet, and as it approaches the well 10, to straighten and travel parallel to the target well to the depth at which the target well is to be plugged. Since the same drilling error exists for the relief well as existed for the original well, the exact location of the end of the relief well will also be unknown, and may also be anywhere within a circle having a diameter of 100 feet or more. Thus, ordinary drilling tolerances could result in the relief well 22 being 200 feet or more away from the target well 10 in the absence of the method of the present invention.

For the initial drilling of the relief well 22, conventional surveying techniques provide a satisfactory guide to the drillers, but as the relief well approaches to within 150 or 200 feet of the target well, more accurate measurements are required. Accordingly, as the relief well is drilled, the drilling tool is periodically withdrawn from borehole 22 and a magnetic field sensor 26, which is secured to a conventional well logging cable, or wireline, 28, is lowered down the borehole 22 by means of conventional well logging equipment carried by vehicle 30. The magnetic field sensor 26 is of the type described and claimed in the aforementioned U.S. patent application Ser. No. 130,764, now U.S. Pat. No. 4,323,848, and includes a magnetometer comprising two pairs of elongated U-shaped cores of laminated, high permeability metal, with adjacent portions of each pair being surrounded by a sensing coil. The sensing coils are arranged at right angles to each other in a horizontal plane, with the legs of the two cores in each pair extending vertically in opposite directions. Each coil produces an output signal proportional to one horizontal component of the magnetic field vector intercepted by its corresponding pair of U-shaped laminated cores, and the two output signals are supplied by way of a signal cable 32 to equipment in the logging vehicle 30 which records and processes the signals for use in determining and magnitude and direction of the detected magnetic field. The magnetometer 26 preferably includes a conventional electronic compass which is sensitive to the earth's magnetic field and which thereby permits accurate orientation of the sensor so that the compass direction and distance from the relief well to the target well can be determined. The signal outputs from the compass are also fed by way of signal cable 32 to suitable recording and processing equipment in vehicle 30.

The magnetic field to be sensed by the magnetometer 26 is the field which is produced by current flow in the steel casing 12 of the well 10 as a result of current injected into the earth (or "country rock") 34 surrounding the wells by means of suitable electrodes. In the embodiment of FIG. 1, a pair of electrodes 36 and 38 are secured to the well logging cable 28 and are lowered into the borehole 22 with the sensor 26. The cable is electrically insulated, for example by an insulating jacket, and the electrodes are secured a considerable distance away from the sensor so that current flow to the ground in the immediate area of the sensor does not appreciably affect the sensor output, since that current flow will vary around the borehole 22 in accordance with the variations in the geologic strata. The borehole 22 is uncased, and the electrodes contact the sides of the borehole so that upon application of an alternating current across the electrodes, current is injected into the earth 34. Current is supplied to the electrodes by means of a pair of power cables (not shown) connected to opposite sides of an A.C. source on the surface, the power cable being supported in the well by the cable 28.

Figure 2:
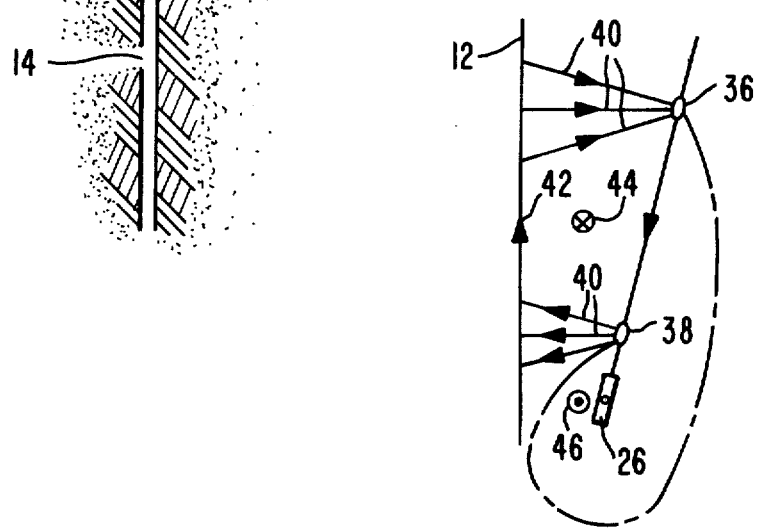
FIG. 2 is a diagrammatic illustration of the ground current flow produced by the apparatus of FIG. 1.

As diagrammatically illustrated in FIGS. 1 and 2, the current flows between the electrodes 36 and 38 in substantially symmetrical paths 40 with respect to borehole 22, the symmetry of the current paths depending upon the conductivity of the surrounding geological formations. In order to insure a sufficient rate of current flow away from the borehole 22, the electrodes 36 and 38 are spaced apart by about 300 feet or more, and the lower electrodes are spaced at least 100 feet from the sensor 26. In the absence of the well casing 12, the electric current 40 flows in a symmetric "polodial" way between the two electrodes and generates a toroidial magnetic field around the borehole 22 in the region between the electrodes, in accordance with Ampere's law. In the absence of perturbing influences, the magnetic field at sensor 26 produced by the current 40 will be very close to zero.

The high electrical conductivity of the well casing drill stem or other long metallic conductor in the original hole 12, however, has a short-circuiting effect on the current 40 and, as illustrated in FIG. 2, concentrates a significant portion of the current on the side of the relief well 22 which faces the target well 10, while reducing the current on the side on the relief well facing away from the target well. The effect of the casing is to introduce a small component of non-symmetric current flow, generally indicated by the arrow 42, in the casing 12. This produces an alternating current loop which in turn produces an alternating magnetic field 44, and 46 perpendicular to the plane passing through both boreholes. The horizontal components of the alternating magnetic field indicated at 46 are detected by the magnetometer 26, and by supplying a current of about 0.4 ampere at a frequency of 32 Hz to the electrodes 36 and 38, corresponding output signals are obtained from the coils of sensor 26, which signals are supplied by way of output line 32 for recording.

The alternating magnetic field indicated diagrammatically at 44 and 46 is distinguishable from the earth's magnetic field, which is detected by a fluxgate compass also located in sensor 26. The vector outputs of the fluxgate compass determine the orientation of the sensor 26 with respect to the earth's magnetic field and provide orientation for the alternating magnetic field detectors. By noting the horizontal components of the alternating magnetic field generated by the perturbed current flow, it is then possible by vectoranalysis to establish the the compass direction from the sensor 26 to the well casing 12, and by careful calibration, this direction can be determined to a few degrees precision.

Depending upon the amount of current injected into the earth by electrodes 36 and 38 and the signal averaging time, the sensor 26 can detect the magnetic field and phase thereof due to current flow in the casing from about 100 feet or more away from the location of casing 12, and by plotting the changes in amplitude and direction as the drilling of the relief well progresses, the distance and direction of the target well can be determined with good accuracy. It should be noted that each measurement is made over a period of several seconds so that signal averaging techniques can be used to determine the amplitude and phase of the alternating magnetic field to a high degree of resolution.

Although the system illustrated in FIGS. 1 and 2 has produced satisfactory results, some difficulties are experienced with this dipole arrangement of electrodes, particularly when one of the electrodes is closer to the sensing tool than to the casing of the target well. It has been found that with this dipole arrangement, a reduced magnetic field in the area of sensor can be experienced, due in part to a reverse flow of current in the casing 12, which flow produces magnetic fields in opposition to the desired field 46, and adversely affects the measurements at the sensor 26. It has also been found that the use of the current dipole source of FIG. 1 produces currents that are seriously affected by nearby geologic structures as well as by the insulating effects associated with the cement sheath around the well casing is in the target borehole which was used in the course of testing the present method.

In order to overcome the difficulties encountered with the system of FIG. 1, the electrode arrangement of FIG. 3 was used to produce the desired current flow in casing 12. As illustrated in FIG. 3, wherein similar elements carry the same numbers as were used in FIG. 1, the downhole electrodes 36 and 38 are eliminated, and in their place a first electrode 50 is positioned at the wellhead 20 of well 10, as near as possible to the location of the casing 12 where it came to the surface before the well had blown. Second and third electrodes 51 and 52 are placed symmetrically on either side of the borehole 10, preferably two miles apart, if possible, in order to obtain a measurable flow of current at the location of the well rupture. A source of alternating current 53 is connected between electrode 50 and electrodes 51 and 52, with ground cables 54 and 55 providing the necessary connection to the electrodes. The earth 34 acts as the return connection from electrodes 51 and 52 to electrode 50, whereby ground currents are injected into the earth.

The ground currents indicated by lines 56 flow to electrode 50 either directly through the ground, or by way of the steel casing 12, with the current in the casing producing a magnetic field having a horizontal component which can be detected by the sensor 26 in the relief well 22. However, a major portion of the current returns to the ground electrode 50 before reaching the depths at which the measurements are to be made. Because of the lower conductivity of the geological structures surrounding the well casing 12, a ten inch (10") diameter steel pipe with a ⅜" wall which is immersed in earth having a resistivity of 2 ohms per meter will carry the same current as the column of earth having a 1,000 foot radius around the casing. Further, the current flow in the casing is attenuated by the alternating current skin effects, as well as by the electrical resistance of the pipe joints and the geometric configuration of the pipe itself.

Accordingly, the magnitude of the current flow in the casing is quite small at depths on the order of 10,000 feet, and an extremely sensitive magnetic flux sensor 26 is required.

The fact that the well casing 12 is not accessible at the surface 16 has little effect on either the magnitude or the pattern of current flow in and around the well at the depths of interest; i.e., around 10,000 feet, although variations in the contact between the casing and the surrounding earth as well as variations in the conductivity in the earth itself will affect the relative amounts of current flowing in the casing and in the column of earth surrounding the casing, and thus will change the effective radius of the column which carries a current equal to the current in the casing.

To use the electric current flow on the well casing to find the target well in the manner described, it is necessary to use alternating current so that the magnetic field observed at the sensor 26 can be distinguished from the much larger magnetic field of the earth. In general, the higher the frequency which can be employed, the easier the measurement is. The well known skin effect severely limits the penetration of an AC field of high frequency into the earth, however, so that at depth on the order of 10,000 feet, a current of approximately 80 amperes must be injected into the ground by the electrodes 50, 51 and 52 in order to produce about 30 milliamperes of current flow on the well casing at 10,000 feet. Because of the skin effect the embodiment shown in FIG. 3 required a 0.25 Hertz excitation frequency rather than 32 Hertz as the embodiment shown in FIG. 1. This would produce an alternating magnetic field equal to approximately 200 milligammas at a distance of about 100 feet from the casing 12 at that depth. Which is a field which is comparable to that generated by the dipole arrangement of FIG. 1.

As previously indicated, the sensor 26 has four (4) distinct frequency modulated telemetry data channels which are fed through the output cable 32. As discussed with respect to FIG. 1, two of these channels transmit signals from the compass in the sensor 26, and these signals correspond to the horizontal vector components of the earth's magnetic field to indicate the orientation of the sensor with respect to magnetic north. The other two data channels in cable 32 carry signals detected by the magnetometer corresponding to the very small alternating magnetic field generated by the current flow on the blown out casing 12, each channel carrying a signal which represents a horizontal component of this magnetic field. The data from the sensor may then be directly processed by a microcomputer at the surface to calculate the direction and distance of the course of the alternating magnetic field by conventional vector analysis. The data so obtained may then be used to plot the relationship between the relief well and the target well to provide a guide for further drilling of the relief well. It will be understood that cable 32 may also include additional channels, as needed.

Figure 4:
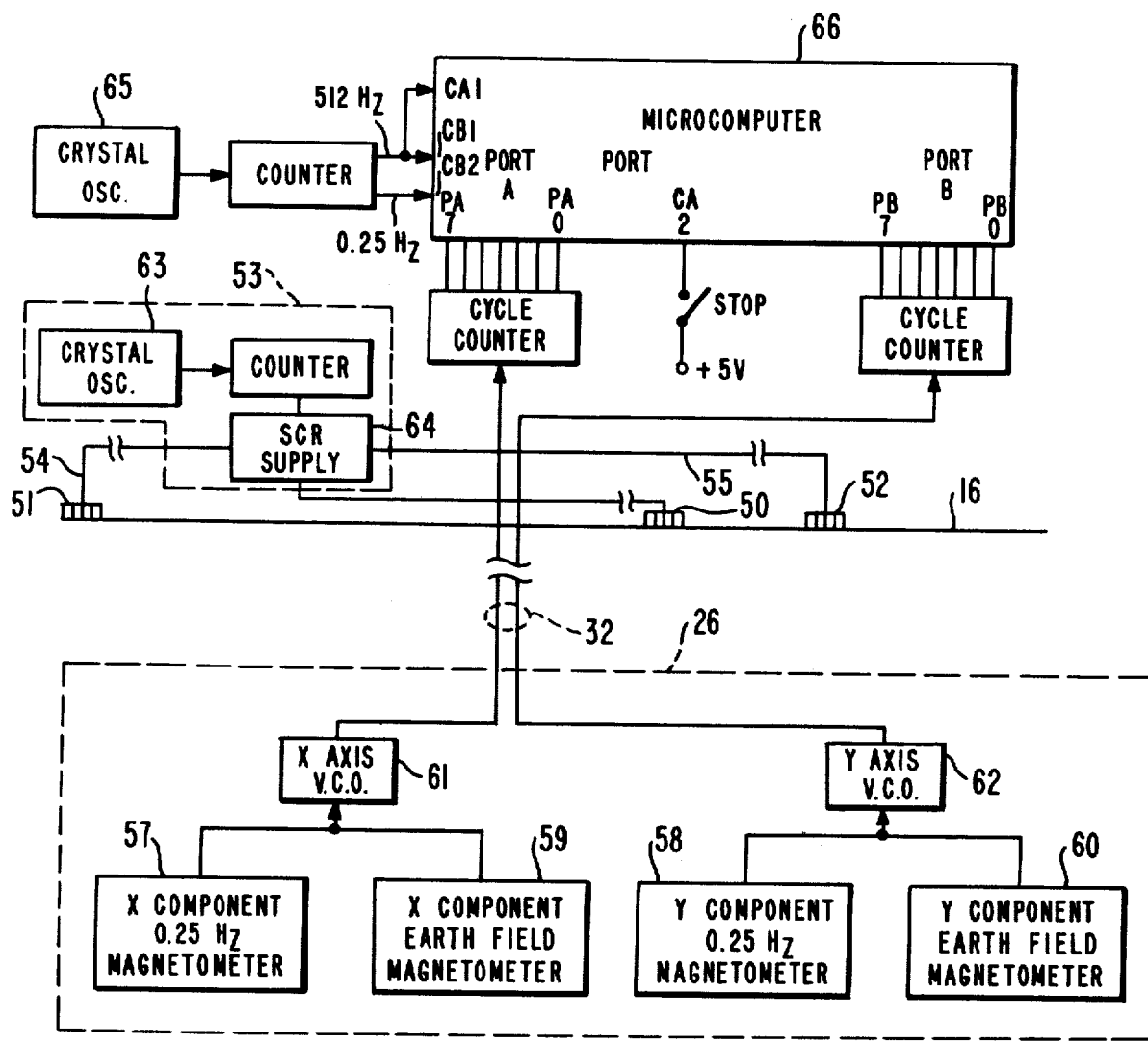
FIG. 4 is a diagrammatic illustration of the electronic circuitry used in the embodiment shown in FIG. 3.

Further details of the electronic circuitry used are shown in FIG. 4. The down hole magnetic field sensors 57, 58, 59 and 60 to generate four analog outputs corresponding to the magnetic field components in the X and Y directions which are two orthogonal axes fixed with respect to the tool in the plane perpendicular to the tool axis. The X axis has two magnetometer outputs from 57 and 59 respectively, an AC output (0.25 Hertz) and a DC output corresponding to that component of the earth's magnetic field. The sum of these two voltages controls a voltage controlled oscillator (VCO) 61 whose output frequency is linearly related to the control voltage. The Y axis of the tool has similar circuitry supplying AC and DC outputs to VCO 62. The two frequency modulated (FM) outputs of the X and Y oscillators are connected to the wireline which carries these signals to the earth's surface.

The down hole tool is powered by direct current supplied by the wireline from a power supply (not shown) on the surface of the earth.

The current injected into the earth is controlled by a crystal oscillator 63 which switches an SCR power supply system 64 back and forth to inject about 80 amperes at 0.25 Hertz into the electrodes, 50, 51 and 52, as shown in FIG. 3. At the beginning of a data session the crystal oscillator 63 is synchronized with another crystal oscillator 65. Oscillator 63 is taken to the electrode site, while oscillator 65 remains at the relief well head to control the data processing electronics.

The FM signals generated by the down hold magnetometer tool and the outputs from crystal oscillator 65 are connected to a microcomputer 66 such as the Rochwell AIM 65 microcomputer and ancillary circuitry as shown in FIG. 4. The microcomputer 66 serves two distinct functions. The first is to demodulate and signal average the FM magnetometer signals generated by the down hole sensors carried by tool 26. The second is to Fourier analyze these signals, and to compute the magnitudes of the AC magnetic field and azimuthal direction to the blown out well. The latter computations are implemented by a BASIC computer program residing in the microcomputer 66.

The primary demodulation of the FM signals is done by the microcomputer under the control of crystal oscillator 65. The 0.25 Hertz square wave to the CB2 input of the computer is in synchronism with the current flow in the electrode system. Each rising edge of CB2 flags the computer that a new four second electrode current period is beginning. The rising edges of 512 Hertz square waves applied to the CA1 and CB1 inputs latch the data present at the Port A and Port B inputs and flag the computer to read these data. Port A and Port B are connected to 8 bit ripple counters which keep a running count of the number of cycles received from each VCO.

The computer reads the two ripple counters 512 times per second following each rising edge on the CA1 (Port A) and CB1 (Port B). The CA1 and CB2 edges are synchronized by logic electronics which are not shown so that the ripple counters are only read during stable periods of these counters.

To demodulate an FM signal, the microcomputer 66 adds the total number of VCO cycles received by the appropriate ripple counter during each of 32 times channels which are spread sequentially from the beginning to end of each four second period of the electrode current. By keeping a running total of the number of VCO cycles received in each time channel the VCO output is signal averaged in a way which systematically removes stochastic noise.

To begin a data run the tool is brought to a new depth by raising or lowering the wireline and allowing the electronics and sonde to stabilize. Under the microcomputer 66 keyboard control the 32 data channels are cleared and signal "stacking" is allowed to begin. To signal the computer to stop by taking data and to process those data in memory a rising edge is applied to microcomputer CA2 input by a push button switch.

The X and Y components of the earth's field are determined by noting the average frequency of each VCO. The X and Y components of the AC magnetic field are determined by computing the 0.25 Hertz sine and cosine Fourier components of the data in the 32 time channels. After the X and Y components of the earth's field and the X and Y components of the AC magnetic field are known, standard trigonometric methods are used to compute the magnitude and phase of the AC magnetic field and the direction to the blown out well.

Figure 5:
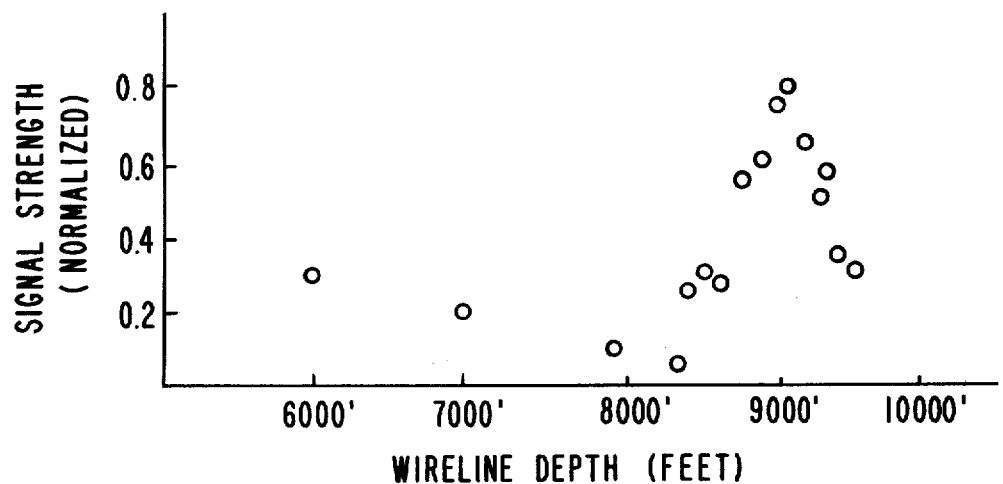
FIGS. 5 and 6 are charts illustrating the results obtained by the method of the invention utilizing the apparatus of FIG. 3.

FIG. 5 is a chart of the amplitude of the resultant, or normalized, signal corresponding to the alternating magnetic fields detected by sensor 26 at varying depths of a relief well in an actual test of the system of FIG. 3. As illustrated, the alternating magnetic fields measured at depths of from about 5,000 feet to about 8,000 feet were dominated by the alternating current flow in the earth rather than in the casing, since the relief well was too far away from the target well. However, at about 8,500 feet the dominant alternating field became that due to current flow on the blown-out well casing, when the relief well was within about 100 feet from the target well. As the well progressed, the amplitude of the signals increased markedly, with the relief well reaching its closest point to the target well at a depth of about 9,150 feet. In the test from which the data illustrated in FIG. 4 was taken, the relief well passed by the target well after that depth, and began to move away from it, thus causing the magnetic field strength to fall off at depths below 9,150 feet, as shown in FIG. 5.

Figure 6:
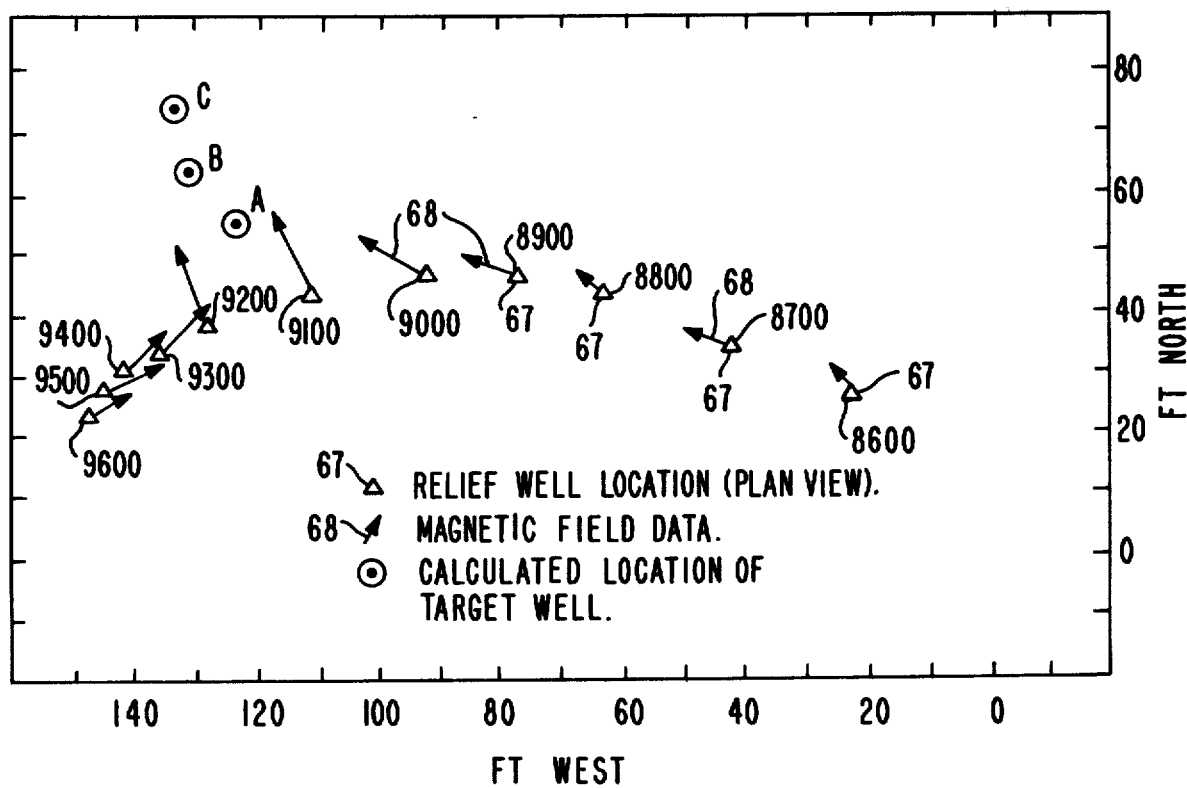

A convenient way to present the directional data obtained from the vector components of the magnetic field signals is to produce a plan view of the trajectory of the relief well as obtained from conventional well survey data and to then superimpose on that plan view a resultant of the magnetic field vectors obtained at the various well depths. Such a plan view is shown in FIG. 6, wherein the small triangles 67 indicate the relative location of the relief well at the various conventional well survey points, which in this case were taken every 100 feet of depth. As shown, the relief well first moved generally west-northwest, and then curved to the west and to the southwest as it progressed in depth from 8,600 feet to 9,600 feet, the relief well traveling approximately 130 feet west in the course of drilling 1,000 feet down. The magnetic field vectors obtained by measurements of the alternating magnetic field at each of the survey points are indicated by the arrows 68 at each survey point, the length of the arrow being proportional to the magnitude of the normalized signal and its direction indicating the normalized direction of the source of the field. Thus, the arrows 68 indicate the direction of the target well casing, and the magnitude of each arrow is inversely proportional to the distance, the larger the arrow, the closer the relief well to the target well. By hypothesizing three possible locations of the target well, indicated by the circles A, B, and C on FIG. 6, and comparing these locations with the data indicated by the magnetic field measurements, it was determined that the target well was in a location approximately between circles B and C. A subsequent redrilling of the relief well intersected the blown out well and confirmed these calculations and indicated that the method of the present invention was capable of accurately locating the target well from a range of over 100 feet.

The method illustrated with respect to FIG. 3 worked well; nevertheless, it was found that there are important advantages in utilizing an electric current source carried by a well cable. For example, the use of surface electrodes of the type illustrated in FIG. 3 involves considerable additional expense in the placement of the electrodes and the installation of thousands of feet of ground cable, requires very high capacity power supplies, and introduces the problem of obtaining access to the land where the electrodes must be placed. Furthermore, the system of FIG. 3 presents a number of difficulties at offshore well sites, for the installation of a surface source of current under water makes the process unnecessarily complex.

It has been found that the system of FIG. 3 must operate at a low frequency, on the order of 0.25 Hz, to insure that the current reaches the depths required. This low frequency reduces the sensitivity of the sensor 26 to the alternating magnetic field and thus requires additional signal averaging in order to obtain usable data. This requires keeping the sensor stationary in the relief hole for several minutes at each depth and, since the relief well is uncased, aggravates the serious problem of the sensor becoming stuck in the relief well. In addition, the loss of signal strength with depth is substantial in the system illustrated in FIG. 3, thus limiting the depth to which the method of the present invention is effective. Accordingly, the preferred system for carrying out the present invention is that which is illustrated in FIG. 7, to which reference is now made.

In FIG. 7, the target bore hole and the relief bore hole, as well as other elements common to FIG. 1 and 3, carry the same identifying numbers as those figures. However, in the FIG. 7 arrangement, the well cable 28 supports a single power line 70 which extends down the bore hole 22 and is connected at its lower end to a single electrode 72. The electrode is supported on the cable 28, which is insulated, for example by neoprene, for the lower 500 feet, with the cable 28 supporting the sensor 26 at a distance of approximately 300 feet below the electrode 72. One side of a source of alternating current 74 having a frequency of about 32 Hz is connected to the upper end of cable 70, with the other side of the AC source being connected by way of cable 76 to a surface casing 78 for well 22. This surface casing may extend approximately 300 feet into the ground to provide a return electrode for current injected into the ground by electrode 72.

The injected current generally follows the current lines 80 in the manner previously discussed. In places where the country rock through which the hole is drilled is uniform and has horizontally lying formations, the current flow will be azimuthally symmetric and no magnetic field will be generated at the sensor 26 positioned directly below the electrode. As before, however, the long, slender, vertical conductor formed by the well casing or drill stem 12 alters this symmetry by concentrating the electric current, as indicated by the arrows 82 and 84 in FIG. 7. As illustrated in this Figure, a portion 82 of the current flows upwardly in the casing from an area in the same horizontal plane as electrode 72, while a portion 84 flows downwardly from that same area, with the return to electrode 78 being through the ground 34. This current generates a horizontally directed magnetic field circulating around the target well in the manner illustrated by arrow 86, and the field generated by current 84 in the portion of the casing nearest sensor 26 will be detected by that sensor. Electric signals corresponding to the horizontal components of that magnetic field are produced by sensor 26, and these signals, together with the output signals from the compass also carried by sensor 26, permit a determination of the direction and distance between the two bore holes, as previously explained.

The magnitude of the magnetic field being detected by sensor 26 can be estimated. It is useful to introduce a parameter $R_o$ which is the radius of earth surrounding the target well 10, having the same resistance per unit length as the blown out well casing 12. If the conductivity of the earth is given by $\sigma_e$ and that of steel by $\sigma_s$, and the well casing has a radius $r_o$ and a wall thickness t, then $R_o$ is given by:

$$R_o = \sqrt{\frac{2\sigma_s}{\sigma_e} r_o t}$$

The electrical conductivity of steel is about $10^7$ (ohm meters)$^{-1}$, while that of country rock in a petroleum environment is within an order of magnitude of 1 (ohm meters)$^{-1}$. Thus, a well casing ten inches in diameter having a one-half inch wall thickness has the same electrical resistance per unit length as a column of earth about 1,000 feet in diameter, as explained above. Such a well casing has a short circuiting effect on vertical current flow within a column of earth approximately this diameter. The sensitivity of the sensor 26 must be such that a magnetic field of less than $10^{-2}$ gammas can be detected. This field corresponds to the magnetic field generated by the flow of two milliamperes of current on a well casing one hundred feet away.

In the absence of the blown out well, current $I_o$ from electrode 72 on the wireline 28 will flow in a spherically symmetric way into the ground. The current density $j_o$ generated by this source at any point a distance of R away will be given by $$j_o = \frac{I_o}{4\pi R^2}$$

Noting that the electric field E and the current density j in the earth are related by $j = \sigma_e E$, the electric potential $\phi_o$ associated with this current flow is given by $$\phi_o(R) = \frac{I_o}{4\pi\sigma_e R}$$

The electric current on the blown out well casing 12 at a point far away from the current source is easy to compute since the electric field in this region is given by $$E = \frac{I_o}{4\pi\sigma_e R^2}$$

The current flow $I_p$ on the casing is then given by $$I_p = \sigma_s 2\pi r_o tE = \frac{R_o^2}{4R^2} I_o$$

To estimate the well current flow close to the source and particularly the rate at which the current flow builds up to the "far field" value $I_p$ given above, a superposition method is useful. Consider a primary current $I_o$ on the wireline 28 and a distributed current source/length $$\frac{dI_1(z)}{dz}$$

along the axis of the blown out well. These current flows lead to a potential $\phi = \phi_o + \phi_1$ in the earth where $\phi_o$ is the potential given by $I_o$ acting alone, and $\phi_1$ the potential generated by the distributed sources ($dI_1/dz$) acting alone. The correct solution to the overall mathematical problem is given by that distribution of current flow from the casing which results in the voltage distribution on the casing, from resistive voltage drops due to current flow on it, matching the earth potential $\phi$ on the surface of the casing.

To estimate $\phi_1$ the potential in the earth near the pipe associated with current flow into the earth from the pipe, consider the flow of current between two concentric cylinders, the inner cylinder having a radius $r_1$ the outer having a radius $r_2$, and both having an axial length $\Delta z$. A current $\Delta I_1$ is imagined to flow from the inner cylinder in a cylindrically symmetric manner. At a radius r the current density $j_1$ is given by $$j_1 = \frac{\Delta I_1}{2\pi r \Delta z}$$

If ($\Delta I_1/\Delta z$) does not vary rapidly with z the associated electric field $E_1$ is given by $$E_1 = \frac{j_1}{\sigma_e} = \frac{I_1}{\Delta z\, \sigma_e 2\pi r}$$

The potential of a point on the surface of the inner cylinder relative to the outer one is given by $$\phi_1 = \frac{\Delta I_1}{\Delta z} \frac{1}{2\pi\sigma_e} \ln(r_2/r_1)$$

If $r_2/r_1 \gg 1$, the potential difference $\phi_1$ between the cylinders is very insensitive to the exact value of $r_2/r_1$; changing $r_2/r_1$ from 100 to 200 changes $\phi$, by less than 15%. The effective value for r will vary slowly with z, the position on the pipe, $r_2 \sim a$ for small z, $r_2 \sim R_o$ for large Z.

Neglecting the effect of the return electrode 78, since it is so far away, the current on the blown out well directly opposite the source, i.e. at z=0, will flow up for points above, and will flow down for points below. The potential on the pipe at z=0 is essentially the same as that much farther down or up since relatively little current flows on the center portion of the pipe. Thus, for a very conductive pipe, to a first approximation near z=0, the potential at the pipe surface is equal to zero, which is also the potential at infinity. Thus, equating $\phi_o$ and $\phi_1$ we find that, for relatively small values of z, the current flow/length to the pipe is given by $$\frac{\Delta I}{\Delta z} = \frac{I_o}{4\pi\sigma_e \sqrt{a^2 + z^2}} \frac{2\pi\sigma_e}{\ln(r_2/r_1)} = \frac{I_o}{2\sqrt{a^2 + z^2}\, \ln(r_2/r_1)}$$

Integrating this equation from z=0 to z, the current flow $I_p$ on the pipe is $$I_p(Z) = \frac{I_o}{2\ln(r_2/r_1)} \ln\left(\frac{z}{a} + \sqrt{1 + \frac{z^2}{a^2}}\right)$$

For small values of z/a this reduces to $$I_p(z) = \frac{I_o}{2\ln(r_2/r_1)} \frac{z}{a} \quad \frac{z}{a} < 1$$

The two values for $I_p$ can be plotted to show the overall current flow on the casing, and the point of intersection of the two curves gives the approximate value of z where the current on the casing is given by the long and short distance approximations, i.e., $z_o \simeq R_o^{\frac{1}{2}} a^{\frac{1}{2}} \ln(r_2/r_1)$. Thus, for the dimensions envisioned, the casing current builds up along the length of the casing for a distance approximately equal to $R_o$, the equivalent radius of the earth column whose resistance per unit length is equal to that of the blown out well, so that a sensor located at a distance $R_o$ below the electrode 72 will sense the magnetic field produced by the maximum current available in the casing.

The magnetic field excitation H at a distance z directly below the electrode, i.e., at the location of the magnetic field sensor, is given as:

$$H(Z) = \frac{I(Z)}{2\pi a}$$

If $z/a \ll 1$, this gives (assuming $R_o > a$)

$$H = \frac{I_o}{4\pi \ln(a/r_1)} \frac{z}{a^2}$$

for $z \gtrsim R_o$ we obtain $$H = \frac{R_o^2}{z^2} \frac{I_o}{8\pi a}$$

From this, the magnetic field values indicated hereinabove are calculated to provide an indication of the sensitivity required in sensor 26.

In the course of testing the monopole arrangement illustrated in FIG. 6, it was found that the overlapping fields from different current paths and the polarity reversal that resulted from the dipole arrangement of FIG. 1 was eliminated, with the result that the magnetic field to be detected was enhanced by an order of magnitude using the same source potential. The result of such magnetic field enhancement is a reduction in the amount of time required to make each field measurement, for the relatively low level of the alternating magnetic fields requires signal accumulation over a period of several seconds to insure that the desired signals can be separated from undesirable noise signals which are produced by a variety of sources, and which interfere with the accurate determination of the direction and range of the target well casing.

The signal from sensor 26 is further enhanced by encasing the magnetometer in a copper tubular jacket 90, illustrated diagramatically in FIG. 8. This jacket extends substantially the entire length of the sensor and fits snugly around it to protect the sensor from currents flowing in the drilling mud and other material in the relief hole 22, which currents can distort the magnetic field in the vicinity of the sensor and introduce noise into the sensor signals.

Thus, there has been disclosed a novel and unique method for detecting the direction and distance of a target well from a sensor located in a relief well so that the direction of drilling the relief well can be controlled to intersect the target well at the desired location. Although several different systems for carrying out the method have been illustrated, the basic method involving the generation of a current in the well casing or other conductive object in the target wall, detecting the magnetic field resulting from that current flow, and determining from the vector signals so obtained and from magnetic compass readings the relative positions of the two wells is common to them all. The determination of range and direction is assisted by means of charts on which plots of the variations in signal strength and the resultant direction of the signal based on the vector signals obtained are produced, whereby an analysis of the information so obtained permits accurate control of the subsequent drilling of the well. Although variations in the method will be apparent to those of skill in the art, it is desired that the true spirit and scope of the present invention be limited only by the following claims:

What is claimed is:

1. A method of locating a target borehole containing an electrically conductive material or object such as a casing, drill stem, or the like and for directing the drilling of a relief borehole to intersect the target borehole, comprising:

partially drilling a relief borehole at a location spaced from said target borehole;

lowering into said relief borehole at least one electrode adapted to inject current into the earth surrounding said relief borehole; connecting a source of low frequency current to said electrode, thereby producing a low frequency alternating electric current flow in the conductive material located in said target borehole, the current flow in said target borehole conductive material producing a target magnetic field;

measuring at selected depth intervals the magnitude, phase and direction of the target magnetic field produced within said relief borehole by the electric current flow in the conductive material in said target borehole;

measuring at said selected depth intervals the magnitude and direction of the earth's magnetic field;

determining from said target borehole magnetic field measurements and said earth's magnetic field measurements at each selected depth interval the compass direction and distance of said target borehole; and further drilling said relief borehole so that it intersects said target borehole at a selected depth below the earth's surface.

2. The method of claim 1, wherein the step of producing an electric current flow in the conductive material in said target borehole comprises:

providing a surface casing for said relief borehole; and connecting said source of low frequency current between said electrode and the surface casing of said relief borehole, whereby injected current flows between said electrode and said surface casing at least in part by way of said target borehole conductive material.

3. The method of claim 1, wherein the step of producing an electric current flow in the conductive material in said target borehole comprises:

lowering into said relief borehole first and second spaced electrodes adapted to inject current into the earth surrounding said relief borehole; and connecting a source of low frequency alternating current between said electrodes, whereby said current flows between said electrodes at least in part by way of said target borehole conductive material, the current flow in said target borehole conductive material producing said target borehole magnetic field.

4. The method of claim 1, wherein measurements of said target borehole magnetic field and the earth's magnetic field are made at different depths of said relief borehole to determine the distance and direction of said target borehole from said relief borehole at each of several selected depth intervals, and further including plotting the determined distances and directions to display the probable location of the target borehole with respect to the relief borehole at each depth interval.

5. The method of claim 1, wherein the step of measuring the magnitude and direction of the magnetic field produced by current flow in the conductive material comprises:

locating a magnetic field sensor at a selected depth within said relief borehole, said sensor being sufficiently spaced from the source of the electric current flowing in said conductive material in said target borehole as to be affected primarily by the magnetic field produced by current flow in said conductive material; and shielding said magnetic field sensor from stray magnetic fields due to non-symmetric current flow adjacent said magnetic field sensor.

6. The method of claim 5, wherein the steps of producing an electric current flow in said conductive material in said target borehole comprises:

lowering into said relief borehole a monopole source of current, said monopole source injecting current into the earth surrounding said relief borehole; and spacing said monopole source from said magnetic field sensor by a distance at least equal to the distance between said target and relief boreholes.

7. Apparatus for locating a target cased borehole or uncased borehole containing a drill stem or other electrically conductive object and for directing the drilling of a relief borehole to intersect the target borehole, comprising:

a first electrode in contact with the ground at the surface of the earth near the well head of said relief borehole;

a wireline for said relief borehole;

a second electrode adapted to contact the ground at a selected depth within said relief borehole, said second electrode being supported by said wireline;

a magnetic field sensor supported by said wireline, said magnetic field sensor being located within said relief borehole below said second electrode a distance sufficient to substantially reduce the effect of magnetic fields due to ground currents from said second electrode;

means for supplying between said first and second electrodes an alternating potential of low frequency to produce a ground current between said electrodes, said ground current being short circuited by said target borehole conductor to produce a target magnetic field detectable by said magnetic field sensor; and protective means at said magnetic field sensor for short circuiting any ground currents within said relief well to prevent such relief well currents from affecting said magnetic field sensor.

8. The apparatus of claim 7, wherein said protective means comprises a copper jacket on said sensor.

* * * * *